US012761335B2

(12) United States Patent
Peng et al.

(10) Patent No.: US 12,761,335 B2
(45) Date of Patent: Oct. 13, 2026

(54) CARRIER PHASE POSITIONING TECHNIQUES

(71) Applicant: ZTE Corporation, Shenzhen (CN)

(72) Inventors: Focai Peng, Shenzhen (CN); Chuangxin Jiang, Shenzhen (CN); Zhaohua Lu, Shenzhen (CN); Cong Wang, Shenzhen (CN); Juan Liu, Shenzhen (CN); Junpeng Lou, Shenzhen (CN); Zhiqiang Han, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 268 days.

(21) Appl. No.: 18/733,077

(22) Filed: Jun. 4, 2024

(65) Prior Publication Data

US 2024/0319352 A1 Sep. 26, 2024

Related U.S. Application Data

(63) Continuation of application No. PCT/CN2022/122950, filed on Sep. 29, 2022.

(51) Int. Cl.
*G01S 11/02* (2010.01)

(52) U.S. Cl.
CPC .................................... *G01S 11/02* (2013.01)

(58) Field of Classification Search
CPC ... G01S 11/02; G01S 5/10; G01S 5/02; H04L 27/2657; H04W 56/0035; H04W 64/00; H04W 24/08
USPC ....................................................... 455/456.1
See application file for complete search history.

(56) References Cited

U.S. PATENT DOCUMENTS

| | | | | |
|---|---|---|---|---|
| 11,936,419 | B2 * | 3/2024 | Manolakos ............ | H04B 1/713 |
| 12,120,057 | B2 * | 10/2024 | Wu ....................... | H04L 5/0042 |
| 12,253,616 | B2 * | 3/2025 | Karjalainen .......... | H04W 64/00 |
| 2022/0022158 | A1 * | 1/2022 | Zarifi et al. ........... | H04L 5/0048 |
| 2023/0046045 | A1 * | 2/2023 | Bao et al. ........... | H04W 64/006 |
| 2024/0007988 | A1 * | 1/2024 | Sundararajan ........ | G01S 5/0273 |
| 2026/0089672 | A1 * | 3/2026 | Li ........................ | G01S 5/0036 |

FOREIGN PATENT DOCUMENTS

| | | | | |
|---|---|---|---|---|
| CN | 100403664 C | * | 7/2008 | ........ H04W 56/0035 |
| CN | 1143840227 | | 12/2021 | |
| CN | 114761832 | | 7/2022 | |

(Continued)

OTHER PUBLICATIONS

Extended European Search Report fo Co-Pending EP Appl. 22 960 192.7, dated Dec. 23, 2024, 8 pages.

(Continued)

*Primary Examiner* — Mahendra R Patel
(74) *Attorney, Agent, or Firm* — Ashurst Perkins Coie US LLP

(57) ABSTRACT

Techniques are described to for carrier phase measurements for wireless communication. An example wireless communication method includes receiving, by a wireless device from a network device, configuration information of a reference signal; performing, by the wireless device, a carrier phase measurement of a carrier that includes the reference signal; and sending, by wireless device, a measurement report comprising a result of the carrier phase measurement of the carrier that includes the reference signal.

9 Claims, 13 Drawing Sheets

(56) References Cited

FOREIGN PATENT DOCUMENTS

| | | | | | |
|---|---|---|---|---|---|
| EP | 3681197 | A1 | * | 7/2020 | ........ H04W 52/0216 |
| EP | 4152774 | | | 3/2023 | |
| EP | 4152774 | A1 | * | 3/2023 | ............ H04W 64/00 |
| WO | WO-2021071581 | A1 | * | 4/2021 | .......... H04W 64/006 |
| WO | WO-2022055683 | A1 | * | 3/2022 | ........... G01S 13/876 |
| WO | WO-2023075949 | A1 | * | 5/2023 | ............... G01S 5/06 |

OTHER PUBLICATIONS

Catt "FL Summary for improved accuracy based on NR carrier phase measurement" 3GPP TSG RAN WG1 Meeting #110 e-meeting, May 9-20, 2022, R1-2207690, 32 Pages.

International Search Report and Written Opinion for PCT/CN2022/122950, filed Sep. 29, 2022, Report dated Jun. 1, 2023, 10 pages.

InterDigital, Inc. "Potential solutions for carrier phase based positioning" 3GPP TSG RAN WG1 #109-e R1-2204134, e-Meeting, May 9-20, 2022, 3 pages.

* cited by examiner

CARRIER PHASE POSITIONING TECHNIQUES

CROSS-REFERENCE TO RELATED APPLICATION

This application is a continuation and claims priority to International Application No. PCT/CN2022/122950, filed on Sep. 29, 2022, the disclosure of which is hereby incorporated by reference herein in its entirety.

TECHNICAL FIELD

This document is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed to improve positioning accuracy for wireless communication (e.g., 5G-NR) based positioning using, for example, carrier phase measurements.

A wireless communication method includes receiving, by a wireless device from a network device, configuration information of a reference signal; performing, by the wireless device, a carrier phase measurement of a carrier that includes the reference signal; and sending, by wireless device, a measurement report comprising a result of the carrier phase measurement of the carrier that includes the reference signal.

In some embodiments, the configuration information includes a total number of a plurality of segments of the carrier that includes the reference signal, and the carrier phase measurement is performed on each of the plurality of segments. In some embodiments, the configuration information includes a value with which a range of an integer N is determined for each of the total number of the plurality of segments, the carrier phase measurement is performed on each of the plurality of segments, and N is an integer part of a measured carrier phase for each of the plurality of segments. In some embodiments, the configuration information includes only one value with which a range of an integer N is determined for only one frequency layer of multiple frequency layers associated with carrier phase positioning (CPP), and N is an integer part of a measured carrier phase. In some embodiments, the configuration information includes a frequency value that indicates a separation between two adjacent segments in frequency domain.

In some embodiments, the configuration information includes a wavelength value that is a function of a speed of light and a frequency value that indicates a separation between two adjacent segments in frequency domain. In some embodiments, the configuration information includes an application scenario for the carrier phase measurement, wherein the application scenario describes an area where a user equipment (UE) and a base station are located. In some embodiments, the configuration information includes a bandwidth for the carrier phase measurement. In some embodiments, the measurement report includes a differential carrier phase value between any two of the total number of segments. In some embodiments, the carrier phase measurement is performed using a first set of one or more antennas within a Phase Error Group (PEG) that is different from a second set of one or more antennas within a timing error group (TEG). In some embodiments, the carrier phase measurement is performed using one Phase Error Group (PEG) that has an identical set of one or more antennas with one timing error group (TEG). In some embodiments, the carrier phase measurement is performed using a Phase Error Group (PEG) that is a sub-set of timing error group (TEG), the PEG includes a first set of one or more antennas, and the TEG includes a second set of one or more antennas.

In some embodiments, the carrier phase measurement is performed using antennas of one Phase Error Group (PEG) that is associated with one reference signal resource. In some embodiments, the carrier phase measurement is performed by the wireless device using antennas in a same receiving Phase Error Group (PEG). In some embodiments, the measurement report includes an angle of arrival that is calculated using the following equation: $\theta=\arccos(\Delta\Phi*\lambda((t1-t0)*v))$, and where arccos( ) is a function of arccosine, $\Delta\Phi$ is a normalized carrier phase difference measured between time t0 and t1, $\lambda$ is a wavelength of the carrier that includes reference signal, and v is a velocity of the wireless device. In some embodiments, the measurement report includes a carrier phase difference measured between time t0 and t1 and a moving speed, where (t1−t0) is a pre-defined time period.

In some embodiments, the carrier phase measurement is performed by the wireless device by adjusting one or more carrier phases according to an angle of departure and beam direction of a beam with which the reference signal is received. In some embodiments, the carrier phase measurement is performed by setting a same reference point for performing timing differential-based positioning and for the performing the carrier phase measurement. In some embodiments, the carrier phase measurement is performed by one Phase Error Group (PEG) applying different reference point from that of a timing error group (TEG). In some embodiments, the carrier phase measurement is performed by one Phase Error Group (PEG) applying different reference transmit-receive point (TRP) from that of a timing error group (TEG). In some embodiments, the carrier phase measurement includes determining a differential carrier phase (CP) value between two adjacent sub-carriers of the carrier.

In some embodiments, the measurement report includes channel impulse response value of the reference signal with a symbol index of the reference signal. In some embodiments, the measurement report includes a channel frequency response value of the reference signal with a sub-carrier index and a symbol index of the reference signal. In some embodiments, the measurement report includes one or more carrier phase measurements of one or more subsets of a resource for the reference signal corresponding to the measurement report of a carrier phase measurement of the resource for the reference signal. In some embodiments, the carrier phase measurement is performed along with a timing based measurement over a same measurement period. In some embodiments, the same measurement period is in response to the carrier phase measurement and the timing based measurement being configured to determine positioning of the wireless device. In some embodiments, the wireless device includes a communication device. In some embodiments, the wireless device includes a base station.

Another wireless communication method includes receiving, by a base station from a network device, a request to transmit a reference signal for positioning; and transmitting, by the base station, the reference signal for positioning using a same transmission Phase Error Group (Tx PEG). In some embodiments, the Tx PEG is identical to transmission timing error group (Tx TEG).

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Current positioning based wireless systems need to be improved. For example, in a park or in an underground park, it is not easy to find a car especially during a busy hour. The 5th Generation mobile communication system (5G or New Radio access technology (5G-NR)) can provide a method on positioning, including, Positioning Reference Signal (PRS) from a base station (gNB) and Sounding Reference Signal (SRS) from a user equipment (UE) on radio side. However, the positioning accuracy of the existing 5G-NR-based positioning solutions may not be high enough (e.g., the positioning accuracy can be one meter or worse). In some harsh environment (e.g., dense urban area), the positioning accuracy of the existing 5G-NR-based positioning solution might be even worse. In some cases, a positioning accuracy of 0.2 meter may be required. However, 5G-NR-based positioning solution may not achieve a high positioning accuracy (e.g., of 0.2 meter) where such accuracy may be needed. To solve at least this technical problem, this patent document describes wireless techniques that can improve positioning accuracy using, for example, carrier phase positioning (CPP).

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Introduction

Figure 1:
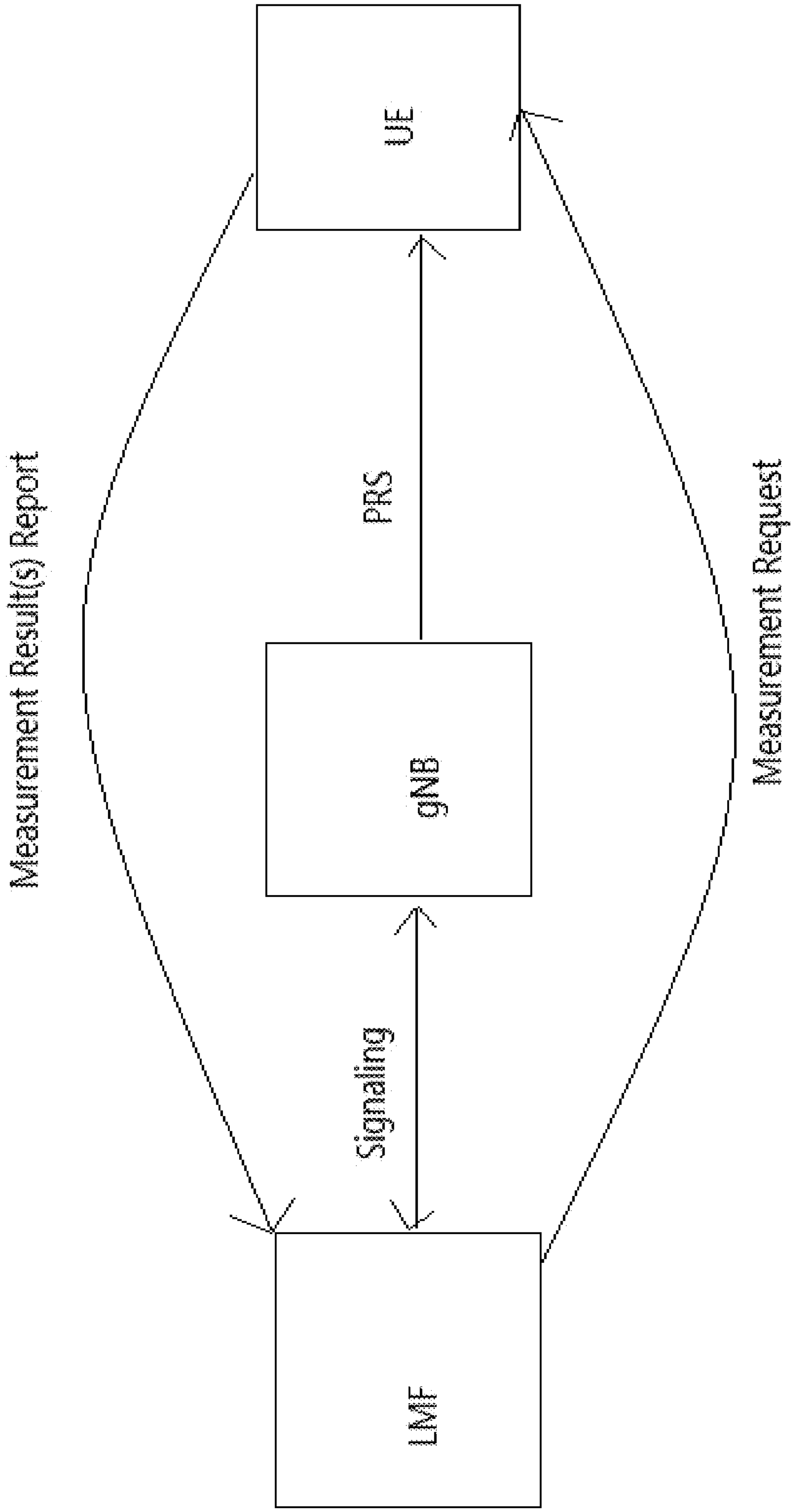
FIG. 1 shows a block diagram for performing positioning based measurement in a downlink (DL) direction.

FIG. 1 shows a block diagram for performing positioning based measurement in a downlink (DL) direction. FIG. 1 shows that in the DL direction, the PRS is transmitted by one or multiple gNB. To achieve a "good" positioning accuracy, multiple gNB can be involved, e.g., three or more base stations. A UE can measure one or more PRS and report the measurement result(s) to network (e.g., a Location Management Function (LMF) in the Core Network (CN, 5G CN, or 5GC). In FIG. 1, network elements include gNB, CN and UE.

Figure 2:
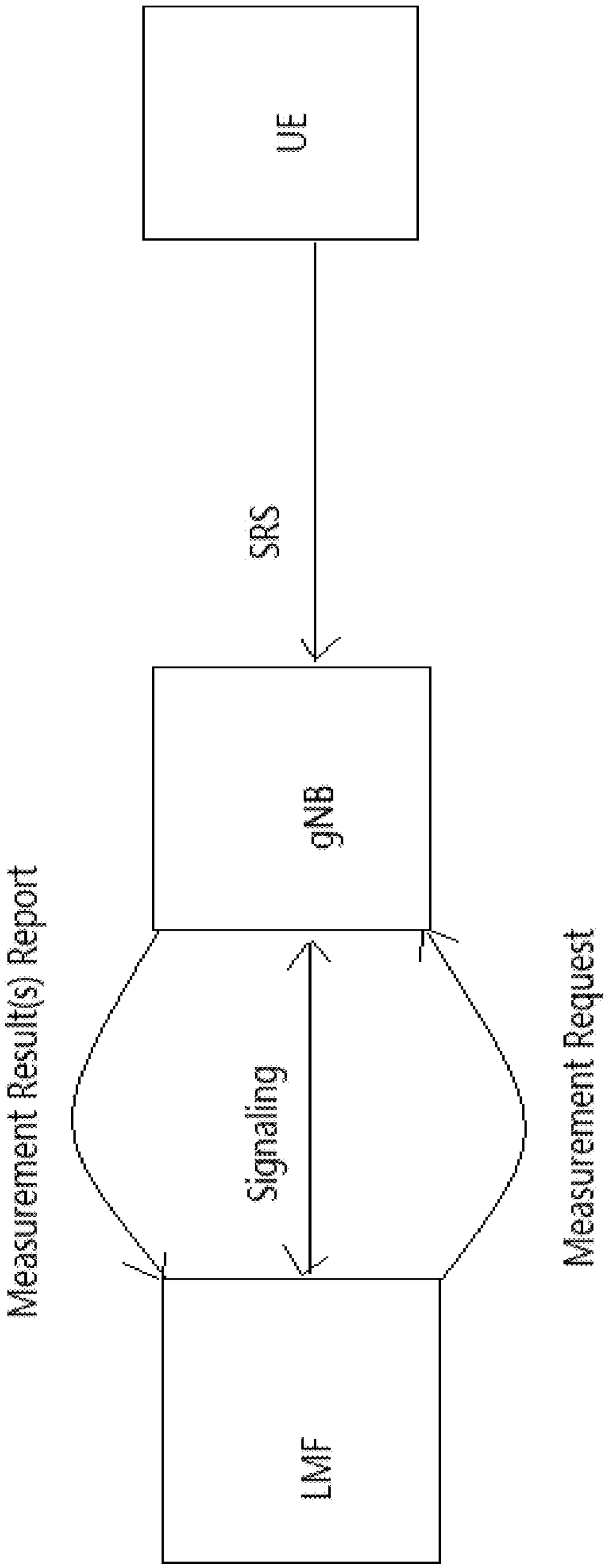
FIG. 2 shows a block diagram for performing positioning based measurement in an uplink (UL) direction.

FIG. 2 shows a block diagram for performing positioning based measurement in an uplink (UL) direction. FIG. 2 shows that in the UL direction, the SRS is transmitted by a UE. One or multiple gNB can measure the SRS and report the measurement result(s) to network (e.g., LMF).

The transmission of PRS and SRS for purpose of positioning can be affected by the radio propagation environment (e.g., fading, distortion). Hence, the positioning accuracy can be limited.

Figure 3:
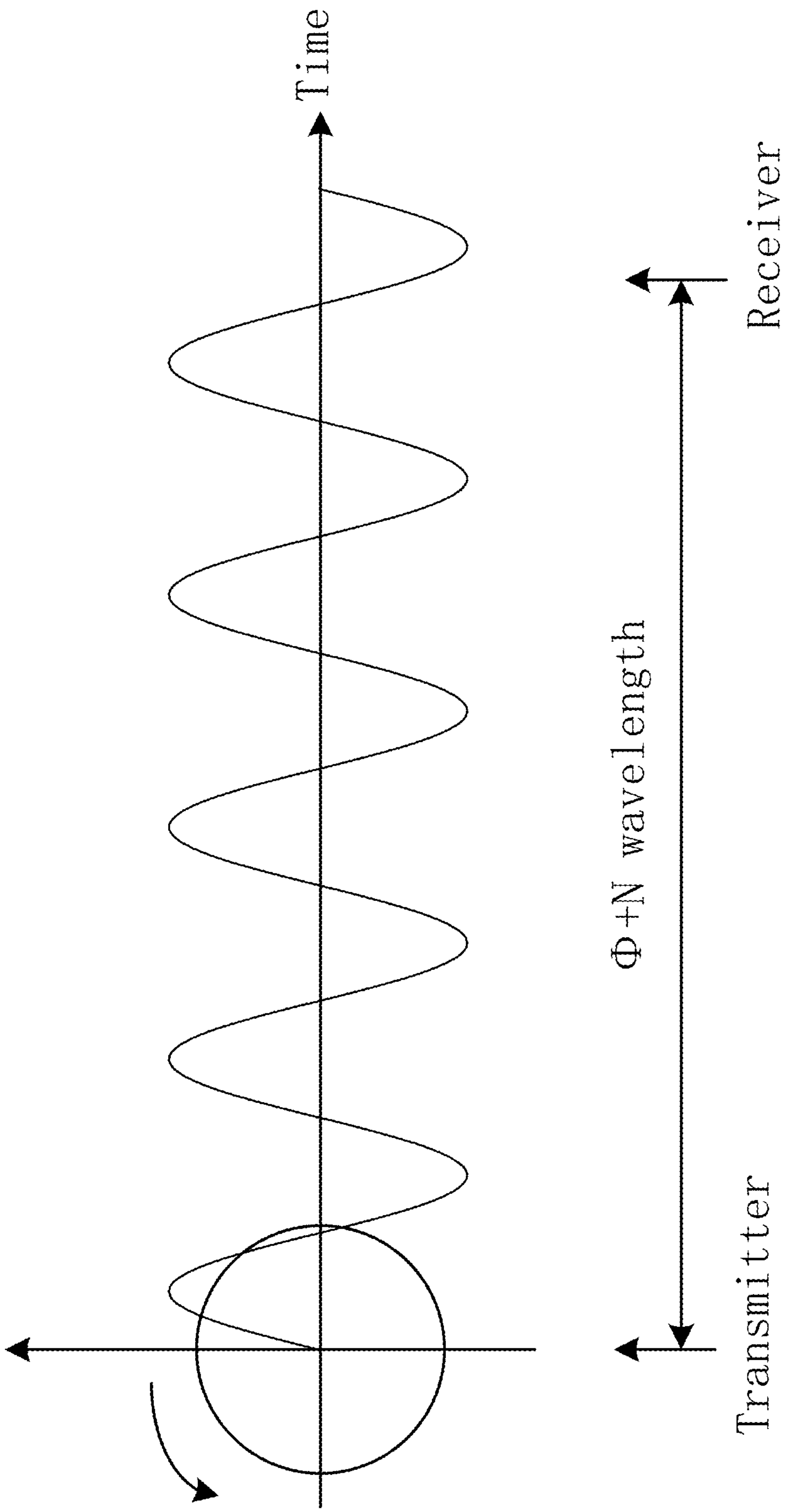
FIG. 3 shows a radio wave traveling from a transmitter to a receiver with multiple wavelength.

FIG. 3 shows a radio wave traveling from a transmitter to a receiver with multiple wavelength. For a full wavelength, the corresponding carrier phase (or carrier phase difference between transmitter and receiver) is $2\pi$. For a fraction part of a wavelength, the corresponding carrier phase is a value within $(0, 2\pi)$. If the carrier phase could be measured (and without noise interference, and an assumption of line of sight, LOS, between transmitter and receiver), then the distance (D) between transmitter and receiver is given by the following equation:

$$D=(\Phi+N)\cdot\lambda=(\Phi+N)\cdot c/f \quad \text{(Equ. 1)}$$

where $\Phi$ is the fraction part of the measured carrier phase, N is the integer part of the measured carrier phase, $\lambda$ is the wavelength of the radio wave transmitted by the transmitter, c is the velocity of light, f is the carrier frequency of the radio wave transmitted by the transmitter. In other words, if a UE can measure the carrier phase (e.g., Φ, N or Φ+N, where the N can be searched with a specific algorithm), then the distance between transmitter and receiver can be determined. In some cases, the carrier phase is only referred to the fraction part, Φ.

II. Example 1: Multiple Carrier Phase (CP) from One Carrier with Multiple Segments The 5G-NR base station utilizes Orthogonal Frequency Division Multiplexing (OFDM) technology which has multiple sub-carriers. Each sub-carrier has its own carrier phase (CP, Φ, fractional part). The CP of the center sub-carrier can represents the CP of the whole carrier.

For a carrier (esp., with OFDM technology), it can be divided into several segments. Each segment can have its own carrier phase. The network (e.g., LMF) can configure/indicate the number of segments (for carrier phase measurement) in a configuration information. For example, for a carrier with a bandwidth of 100 MHz and a sub-carrier spacing (SCS) of 30 kHz, if the number of segments were configured as three, then each segment has 273/3=91 resource blocks (RB) and, these three segments will measure/report their carrier phases (e.g., 3 CP, or 3 CP measurements, or 3 CP values).

In some embodiments, the network (e.g., LMF) can configure a value with which a range for integer N can be determined (esp., for the UE-based positioning, e.g., location resolution being at UE side). In some embodiments, the network (e.g., LMF) can configure the value with which the range for integer N for each segment can be determined. For example, the value can be 1, 2, and 3 respectively for the first/second/third segment so that the range is N±1, N±2, N±3, respectively. The network (e.g., LMF) can indicate in a configuration information one or more values for each of one or more segments, where the one or more values can be used to determine a range for integer N for each segment.

In some embodiments, a UE can indicate/recommend the value with which a range for integer N (e.g., for the UE-assisted positioning, e.g., location resolution being at LMF side) can be determined for each segment. For example, the value can be 4, 5, and 6 respectively for the first/second/third segment so that the range is N±4, N±5, N±6, respectively.

In some embodiments, the separation between segments is related to carrier bandwidth, SCS, application scenario. In some embodiments, the separation between two adjacent segments is related to carrier bandwidth, SCS, application scenario. For example, for a typical indoor factory application, a coverage of L=300 m is enough. Hence, a (virtual) wave-length of λ=L=300 m can ensure the (virtual) integer part N being zero (e.g., no integer search required. It should be noted that, a small integer N is also workable. A small integer or zero can facilitate location resolution, e.g., N±10). The virtual wave-length is defined as $$\lambda = c/\Delta f = c/(f_1 - f_2) \qquad \text{(Equ. 2)}$$

where the $\Delta f=f_1-f_2$ is the (frequency) separation between two adjacent segments.

For a virtual wave-length of λ=L=300 m, the $\Delta f=f_1-f_2$ is 1 MHz. For a SCS of 15 kHz, there are $\Delta f/(12*SCS)=10^6/(12*15000)=5.5\approx 6$ RB in it. For other cases, the number of RB in the separation between two adjacent segments are $$N^{RB} = \text{ceil}\left(\frac{\Delta f}{12 * SCS}\right) \qquad \text{(Equ. 3)}$$

In some embodiments, the number of segments ($N^{Seg}$) is related to carrier bandwidth (BW, with a unit of RB), SCS, application scenario as the following.

$$N^{Seg} = \text{ceil}\left(\frac{BW}{N^{RB}}\right) \qquad \text{(Equ. 4)}$$

For example, for a bandwidth BW=20 MHz with a SCS of 15 kHz in indoor factory application, the number of segments is $$N^{Seg} = \text{ceil}\left(\frac{106}{6}\right) = 18.$$

In some embodiments, the network (e.g., LMF) can configure the (frequency) separation between two adjacent segments, where the frequency separation between two adjacent segments can be included in configuration information sent by the network to a wireless device (e.g., UE or gNB). In some embodiments, the network (e.g., LMF) can configure the separation between two adjacent segments. For example, the separation between two adjacent segments is 2 MHz (or, 12 RB, or, 24 sub-carrier). A UE (or gNB, or Transmission-Receiving-Point, TRP) can compute the number of segments according to Equ 3-4 and bandwidth of a carrier (or of bandwidth part, BWP).

In some embodiments, the network (e.g., LMF) can configure the virtual wave-length λ for CP measurement, where the virtual wave-length λ can be included in configuration information sent by the network to a wireless device (e.g., UE or gNB). With this virtual wave-length λ, a UE (or gNB) can compute separation between two adjacent segments and, the number of segments according to Equ. 3-5 and bandwidth of a carrier.

$$\Delta f = c/\lambda \qquad \text{(Equ. 5)}$$

In some embodiments, the network (e.g., LMF) can configure the application scenario for CP measurement, where the application scenario describes an area where a UE and gNB can be located, and where the application scenario can be included in configuration information sent by the network to a wireless device (e.g., UE or gNB). A UE (or gNB) can figure out (or determine) the virtual wave-length λ using the following table.

| Application scenario | Virtual wave-length λ (m) |
|---|---|
| Indoor factory | 300 |
| Urban | 400 |

In some embodiments, the network (e.g., LMF) can configure the application scenario and the value (M) with which a range for integer N is determined for CP measurement, e.g., the range can be N±M, M=10. The application scenario and the value M can be included in configuration information sent by the network to a wireless device (e.g., UE or gNB). A UE (or gNB) can figure out (or determine) the virtual wave-length λ using the following table.

| Application scenario | Range of integer M | Virtual wave-length λ (m) |
|---|---|---|
| Indoor factory | 10 | 300/M = 30 |
| Urban | 9 | 400/M = 44.4 |

In some embodiments, a UE (or gNB) measures/reports the differential carrier phase between segments. In some embodiments, a UE (or gNB) measures/reports the differential carrier phase between two adjacent segments. For example, if there were S=18 segments and, the corresponding carrier phases are $\Phi_1, \Phi_2, \ldots, \Phi_S$, then the S−1=17 differential carrier phases are measured/reported as $\Phi_2-\Phi_1$, $\Phi_3-\Phi_2, \ldots, \Phi_S-\Phi_{S-1}$.

With differential carrier phase(s), the range of integer (M) searching can be minimized (or be zero) because $$\frac{\Delta\Phi + \Delta N}{\frac{1}{\lambda_2} - \frac{1}{\lambda_1}} = D$$

which will reduce the computation complexity of location de-composition.

In some embodiments, a UE (or gNB) measures/reports the carrier phase (including differential carrier phase) with confidence (or accuracy level, e.g., two sigma, e.g., 95.44%).

In some embodiments, a UE (or gNB) measures/reports the carrier phase of each sub-carrier of reference signal for positioning. In some embodiments, a UE (or gNB) measures/reports the carrier phase of all the sub-carrier of reference signal for positioning with group (e.g., 6 RB is set as a group, e.g., one CP value for one group, one CP value for 6 RB, one CP value for 6 contiguous RB as a whole). In some embodiments, a UE (or gNB) measures/reports the carrier phase of all the sub-carrier of reference signal for positioning with order (e.g., order of sub-carrier index, from low to high).

In some embodiments, statistic value(s) of CP is measured/reported as the following, esp., for multiple contiguous or discontinue measurements.

Mean value.

Variance.

Standard variance (STD).

K factor (or Rician factor) or the power ration of the strongest path to other path.

In some embodiments, a UE (or gNB) measures/reports the environment evaluated when receiving the reference signal for positioning. For example, an environment with LOS path, an environment with NLOS path, a mixture environment of LOS/NLOS path can be reported.

Figure 4:
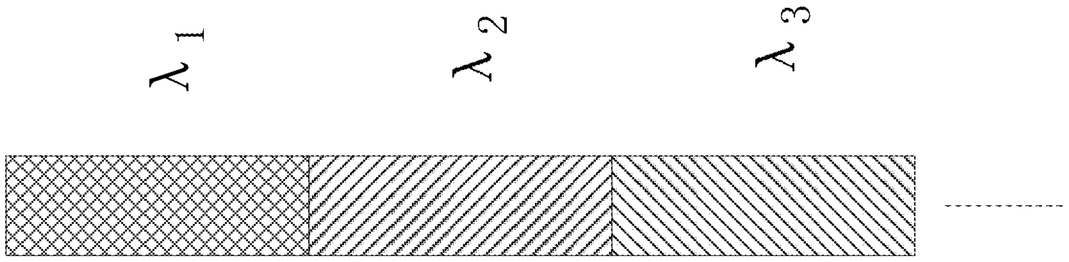
FIG. 4 shows configuration of a wavelength in a carrier for carrier phase (CP) measurement.

In some embodiments, the network (e.g., LMF) can configure some wave-length (or virtual wave-length) in a carrier for CP measurement as shown in FIG. 4, where the wave-length (or virtual wave-length) can be included in configuration information sent by the network to a wireless device (e.g., UE or gNB). A UE (or gNB) measures/reports the CP value(s) for these wave-length (or virtual wave-length). In some embodiments, a wave-length (or virtual wave-length) can contain one or multiple CP value(s). In some embodiments, these wave-lengths (or virtual wave-lengths) can be confined with some relationship (e.g., $\lambda_1=2\lambda_2=3\lambda_3$).

In some embodiments, a UE (or gNB, or TRP) can be configured with multiple carriers (or multiple positioning frequency layer, PFL) by the network (e.g., LMF). For CPP of multiple carriers/PFL, (only) one value with which range is determined for integer N is configured for (only) one of those carriers/PFL. In some embodiments, for CPP of multiple carriers, (only) one value with which range is determined for integer N is configured for (only) one of those carriers while the value(s) with which range(s) is determined for integer N of other carrier(s) is/are deduced from the configured range for integer N. In some embodiments, for CPP of multiple carriers, (only) one value with which range is determined for integer N is configured for (only) one of those carriers while the value(s) with which range(s) is determined for integer N of other carrier(s) is/are deduced from the configured range for integer N and frequency. In some embodiments, for CPP of multiple carriers, (only) one value with which range is determined for integer N is configured for the carrier with the lowest frequency. In some embodiments, for CPP of multiple carriers, (only) one value with which range is determined for integer N is configured for the carrier with the highest frequency. In some embodiments, for CPP of multiple carriers, (only) one value with which range is determined for integer N is configured for the carrier with the lowest carrier index. For example, if there are 3 carriers configured for a UE: one carrier (centered) on 2 GHz, one carrier (centered) on 4 GHz, one carrier (centered) on 6 GHz, then only one value (M) with which range is determined for integer N (e.g., N±M, M=10) is configured for the carrier (centered) on 2 GHz. Then the range for integer N for the carrier (centered) on 4 GHZ is N±ceil ($M*f_2/f_1$)=N±ceil(M*4/2)=N±20 while N±30 for the carrier (centered) on 6 GHz.

In some embodiments, a UE (or gNB, or TRP) can be configured with a bandwidth for carriers phase measurement/report by the network (e.g., LMF). For example, for a carriers with a bandwidth of BW=100 MHZ, the bandwidth configured for carriers phase measurement/report by the LMF is B=20 MHz, then a UE (or gNB, or TRP) should measure/report BW/B=100/20=5 carriers phases (each on its own center frequency). For another example, for a carriers with a bandwidth of BW=200 MHz, the bandwidth configured for carriers phase measurement/report by the LMF is B=30 MHz, then a UE (or gNB, or TRP) should measure/report floor(BW/B)=floor(200/30)=6 carriers phases (while the last 20 MHz is not measured/reported). For still another example, for a carriers with a bandwidth of BW=200 MHZ, the bandwidth configured for carriers phase measurement/report by the LMF is B=30 MHz, then a UE (or gNB, or TRP) should measure/report ceil (BW/B)=ceil(200/30)=7 carriers phases (Note: the last segment only has 20 MHz, not 30 MHz). For still another example, for a carriers with a bandwidth of BW=100 MHZ, the bandwidths configured for carriers phase measurement/report by the LMF are 20 MHz, 30 MHz, 50 MHz, then a UE (or gNB, or TRP) should measure/report three carriers phases on these three segments. The advantage of this configuration is that, a location end (e.g., LMF) can easily generate a modest integer N for searching (e.g., a longer virtual wave-length, e.g., a small integer N).

In some embodiments, a UE (or gNB, or TRP) should measure at least X RB (or sub-carriers, e.g., X=6 RB, X=72

SC, or at least X=20 MHZ) when measuring carrier phase of reference signal. The value of X can be configured by the network.

In some embodiments, when a UE is in radio resource control (RRC) Inactive (RRC_Inactive) state (or RRC_Idle state), a UE can measure/report carrier phase of reference signal within the initial downlink (DL) BWP. In some embodiments, when a UE is in RRC_Inactive state (or RRC_Idle state), a UE can measure/report carrier phase of reference signal outside the initial DL BWP (e.g., the whole bandwidth of reference signal for positioning in a carrier, e.g., 100 MHz while 20 MHz for initial DL BWP). In some embodiments, a BWP can be the BWP that operates without bandwidth restriction (e.g., the nominal bandwidth of a BWP in a carrier with 100 MHz is 20 MHz while the reference signal for positioning spans on whole carrier, e.g., 100 MHz. For this example, the number of segment depends on the bandwidth of reference signal for positioning, not on nominal bandwidth of a BWP. Similarly, the number of RB, RBG, sub-carriers and corresponding number of CP value also depend on the bandwidth of reference signal).

In some embodiments, when a UE reports carrier phase of reference signal, it should also report uncertainty of carrier phase (e.g., in an unit of Rad, or degree in angle, or normalized phase with a range of 0.0~1.0, or an unit of 2π, e.g., 0.001*2π).

In some embodiments, when a UE reports carrier phase of reference signal, it should also report uncertainty of integer part N. In some embodiments, when a UE reports carrier phase of reference signal, it should also report uncertainty of the value with which range is determined for integer part N (e.g., N±5). So, in the example, where the value is 5, the uncertainty of the value 5 is reported.

The carrier phase measurement of reference signal can be part of classical positioning technology (e.g., time difference time of arrival, TDOA, reference signal time difference, RSTD). In some embodiments, when a UE reports TDOA measurement, the carrier phase of reference signal can be measured/reported.

In some embodiments, the resource(s) (set) of reference signal for positioning for classical positioning technology (e.g., TDOA, RSTD, round trip time, RTT) can identical to that of carrier phase measurement. In some embodiments, if the resource(s) (set) of reference signal for carrier phase measurement were difference from that of reported classical positioning technology (e.g., TDOA, RSTD, RTT, multi-RTT), then the resource(s) ID (or resource set ID) of reference signal should be given/listed.

In some embodiments, the resource(s) (set) of reference signal for carrier phase measurement is/are sub-set(s) of that for classical positioning technology (e.g., TDOA).

In some embodiments, a UE (or gNB, or TRP) can be requested with expected integer N when it reports carrier phase measurement result(s) to LMF. In some embodiments, a UE (or gNB, or TRP) can be requested with value with which range is determined for integer N when it reports carrier phase measurement result(s) to LMF.

With this method, the distance between UE and base station can be precisely computed (even without integer searching). Hence, the performance of positioning can be improved.

III. Example 2: Phase Error Group (PEG)

In general, at one moment, different transmission antenna (or receiving antenna) has different transmission phase (or receiving phase) even for the same signal with identical distance between transmitter and receiver. If the phase difference between two antennas were too large, then the carrier phase positioning will run wrong.

If two (or more) antennas had similar (or near) phase error margin (or phase offset margin), then they can be grouped into the same Phase Error Group (PEG) according to their phase error margin. Similarly, for transmission antennas, they can be grouped into one or more transmission PEG (Tx PEG). Similarly, for receiving antennas, they can be grouped into one or more receiving PEG (Rx PEG). Similarly, for (receiving and transmission) antennas (e.g., round trip, or round-trip-phase measurement), they can be grouped into one or more receiving PEG (RxTx PEG).

Figure 5:
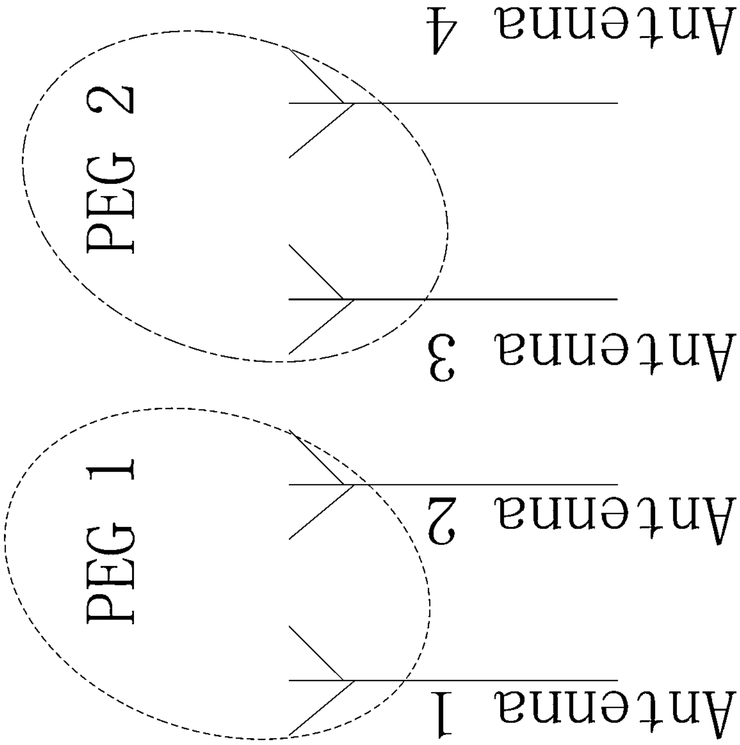
FIG. 5 shows a configuration of antennas and Phase Error Groups (PEGs).

In some cases, the timing error margin between two antennas may be close but the phase error margin between two antennas may be large. Hence, the PEG can be different from that of timing error group (TEG). That is, the antenna(s) within a PEG and the antenna(s) within a TEG may be different. For example, as shown in FIG. 5, the antenna #1 and antenna #2 are in PEG 1 and, the antenna #3 and antenna #4 are in PEG 2 but, the antenna #1 and antenna #3 are in TEG 1 and, the antenna #2 and antenna #4 are in TEG 2.

In some embodiments, one PEG has the identical antenna(s) with one TEG. In some embodiments, the index of PEG is identical to that of TEG.

In some embodiments, a PEG can be a sub-set of TEG. In some embodiments, antennas in a PEG can be a sub-set of antennas in TEG. That is, within a TEG, a PEG with a same (or nearly same) phase error margin is selected for signal transmission/reception. In some embodiments, within a TEG, a same PEG is selected for signal transmission/reception. In some embodiments, a timing error margin (TEG) should be fulfilled before selecting a PEG.

In some embodiments, a UE (or gNB, or TRP) can be requested by the network (e.g., LMF) to measure carrier phase with the same PEG. In some embodiments, a UE (or gNB, or TRP) can be requested to measure carrier phase using antennas in the same Rx PEG.

In some embodiments, a UE (or gNB, or TRP) can be requested by the network (e.g., LMF) to transmit reference signal with the same PEG. In some embodiments, a UE (or gNB, or TRP) can be requested by the network (e.g., LMF) to transmit reference signal with antennas in the same Tx PEG. In some embodiments, the Tx PEG is/are identical to the Tx TEG. In some embodiments, the antenna port(s) in the Tx PEG is/are identical to the antenna port(s) in Tx TEG. In some embodiments, the resource(s) (fore reference signal) associated with an antenna port in the Tx PEG is/are identical to the resource(s) (fore reference signal) associated with an antenna port in Tx TEG. In some embodiments, the antennas in the Tx PEG are identical to the antennas in Tx TEG.

In some embodiments, one PEG is associated with one RS resource (with resource ID). In some embodiments, one PEG is associated with one RS resource set (with resource set ID). In some embodiments, one antenna in a PEG is associated with one RS resource (with resource ID).

If the carrier phase measurement were reported with PEG ID, then a UE (or gNB, or TRP) also reports the association between PEG ID and RS resource (set). In some embodiments, if the carrier phase measurement were reported with PEG ID, then a UE (or gNB, or TRP) also reports the association between PEG ID and RS resource if there were more than one RS resource.

In some embodiments, if the carrier phase measurement were reported with Rx PEG ID, then a UE (or gNB, or TRP) also reports the association between Rx PEG ID and RS resource.

In some embodiments, if the carrier phase measurement were reported with Tx PEG ID, then a UE (or gNB, or TRP) also reports the association between Tx PEG ID and RS resource. In some embodiments, if the carrier phase measurement were reported with Tx PEG ID, then a TRP also reports the association between TRP RxTx PEG ID and RS resource. In some embodiments, if the carrier phase measurement were reported with RxTx PEG ID, then a TRP also reports the association between TRP Tx PEG ID and RS resource.

The maximum number of PEG is one of {1, 2,4,6,8,12, 16,24,32, 48, 64} (e.g., 48). In some embodiments, the maximum number of Rx PEG is one of {1, 2,4,6,8,12,16, 24,32, 48, 64} (e.g., 64). In some embodiments, the maximum number of Tx PEG is one of {1, 2,4,6,8,12,16,24,32, 48, 64} (e.g., 32). In some embodiments, for UE-assisted positioning, the maximum number of Rx PEG is one of {1, 2,4,6,8,12,16,24,32, 48, 64} (e.g., 24). In some embodiments, for UE-based positioning, the maximum number of Rx PEG for UE is one of {1, 2,4,6,8,12,16,24,32, 48, 64} (e.g., 16). In some embodiments, for LMF-based positioning, the maximum number of Rx PEG for TRP (or gNB) is one of {1, 2,4,6,8,12,16,24,32, 48, 64} (e.g., 12). In some embodiments, the number of PEG is a kind of UE capability (per band or band combination or per UE).

For the same RS resource from a TRP (or gNB, or UE), a UE (or gNB, or TRP) can be requested to measure/report carrier phase (measurement result) with different PEG. In some embodiments, for the same RS resource from a TRP, a UE can measure carrier phase with different Rx PEG. In some embodiments, for the same RS resource from a TRP, a UE can measure carrier phase with P different Rx PEG where P depends on UE capability (e.g., P=2). In some embodiments, for the same SRS resource from a UE, a TRP (or gNB) can be requested to measure/report carrier phase with P different Rx PEG (e.g., P=8). In some embodiments, for the same SRS resource from a UE, a TRP (or gNB) can be requested to measure/report carrier phase with P different RxTx PEG (e.g., P=8). In some embodiments, for the same SRS resource from a UE, a TRP (or gNB) can be requested to measure/report carrier phase with P different RxTx PEG (e.g., P=8) when reporting RxTx PEG related carrier phase measurement result(s).

In some embodiments, a TRP (or gNB, or UE) should report Tx PEG association information. In some embodiments, a TRP (or gNB, or UE) should report Tx PEG association information (e.g., the mapping between resource ID and Tx PEG ID) when reporting RxTx PEG related carrier phase measurement result(s). In some embodiments, a TRP (or gNB, or UE) should report Tx PEG association information (e.g., the mapping between resource ID and PEG ID) when reporting Rx PEG related carrier phase measurement result(s). In some embodiments, a TRP (or gNB, or UE) should report Tx PEG association information (e.g., the mapping between resource ID and PEG ID) when reporting Tx PEG related carrier phase measurement result(s).

The phase calibration of PEG can be requested by the network (e.g., LMF). After phase calibration, the phase error in a PEG should be within a range (e.g., 0.001 in difference).

A UE (or gNB, or TRP) can group those antennas with large antenna spacing into one PEG (e.g., antenna spacing>$\lambda/2$). In some embodiments, a UE (or gNB, or TRP) can group those antennas with small antenna spacing into one PEG (e.g., antenna spacing≤$\lambda/2$).

A UE (or gNB, or TRP) can group those antennas with similar antenna phase center offset into one PEG.

A UE (or gNB, or TRP) can report CP measurement(s) with association with one PEG. In some embodiments, a UE (or gNB, or TRP) can report CP measurement(s) with association with one PEG and one TEG.

With this method, the CP can be measured more precisely. Hence, the performance of positioning can be improved with accurate CP value(s).

IV. Example 3: Phase Synchronization (Between Base Stations)

In some cases, the carrier phase at transmitter of each base station may be different. It will cause location error when applying carrier phase positioning. To this end, carrier phase synchronization between base stations is utilized.

First, the time synchronization and frequency synchronization are achieved before carrier phase synchronization. For example, for CP measurement(s) for multiple (sub-) carriers, a timing synchronization is helpful for correct carrier phase setting/measuring.

Secondly, the phase synchronization is achieved. For example, each transmission point (TP) transmits reference signal with identical phase (e.g., zero phase) at one moment (e.g., at the start of one symbol, at the start of one frame, at the start of one sub-frame, at the start of one slot).

For the phase synchronization, a phase synchronization accuracy should be defined, e.g., $\pi/100$ Rad, or $\pi/1000$ Rad, or 0.01 Rad, or 0.001 Rad. In some embodiments, the phase synchronization accuracy can be expressed in number of bits (e.g., 10 bits, then the phase synchronization accuracy will be $\frac{1}{2}^n=\frac{1}{2}^{10}=\frac{1}{1024}$ Rad).

In some embodiments, the network (e.g., LMF) can request a gNB (or TRP) for phase synchronization. After that, a gNB (or TRP) can transmit positioning reference signal for CP measurement. Then, a positioning reference unit (PRU) can measure/report the CP value of gNB (or TRP). The PRU can be a wireless device that can be fixed in location. The network (e.g., LMF) can forward the CP value to the corresponding gNB (or TRP). In some embodiments, the network (e.g., LMF) can forward the CP error value (or CP difference value) to the corresponding gNB (or TRP). Then the gNB (or TRP) can adjust its carrier phase (at next transmission).

In some embodiments, a PRU can report the difference between the CP measured and the CP calculated with real distance between itself and the target gNB (or TRP) if it knew the location of the target gNB (or TRP) (e.g., forwarded by the LMF). In some embodiments, if the phase difference (phase gap between them) were too large (e.g., >$\pi/10$), a phase adjustment should be performed (e.g., a LMF will initial a phase adjustment procedure).

If a UE were equipped with Global Navigation Satellite System (GNSS)/Global Position System (GPS), it can also measure/report the CP value of gNB (or TRP), companied with location (e.g., its coordinates). In some embodiments, a UE can measure/report the CP value of gNB (or TRP) with its location to gNB (or TRP).

It should be noted that, a PRU can be used for timing synchronization with reporting of carrier phase.

With this method, the carrier phase synchronization between base stations can be achieved. Hence, the performance of positioning can be improved.

V. Example 4: AoA with Single Antenna

In some cases, e.g., for a Reduced Capability (RedCap) UE, it can have single receiving antenna. In some cases, a RedCap UE requires a low accuracy of positioning. In some cases, a UE requires a coarse positioning performance. To this end, an AoA with single antenna can achieve this target.

First, a UE gets its moving speed v. For example, this UE can get velocity v from sensor(s), inertia navigation system (INS) installed on itself. If not, a UE can get the velocity v as the following equation.

$$V = c * \Delta f / f_c = c * (f_{t_1} - f_{t_0}) / f_c \quad \text{(Equ. 6)}$$

where, $f_{t_1}$ is the carrier frequency at time $t_1$, $f_{t_0}$ is the carrier frequency at time $t_0$, $f_c$ is the (nominal) carrier center frequency. Actually, the frequency difference between $t_1$ and $t_0$, e.g., $\Delta f$ is enough.

Figure 6:
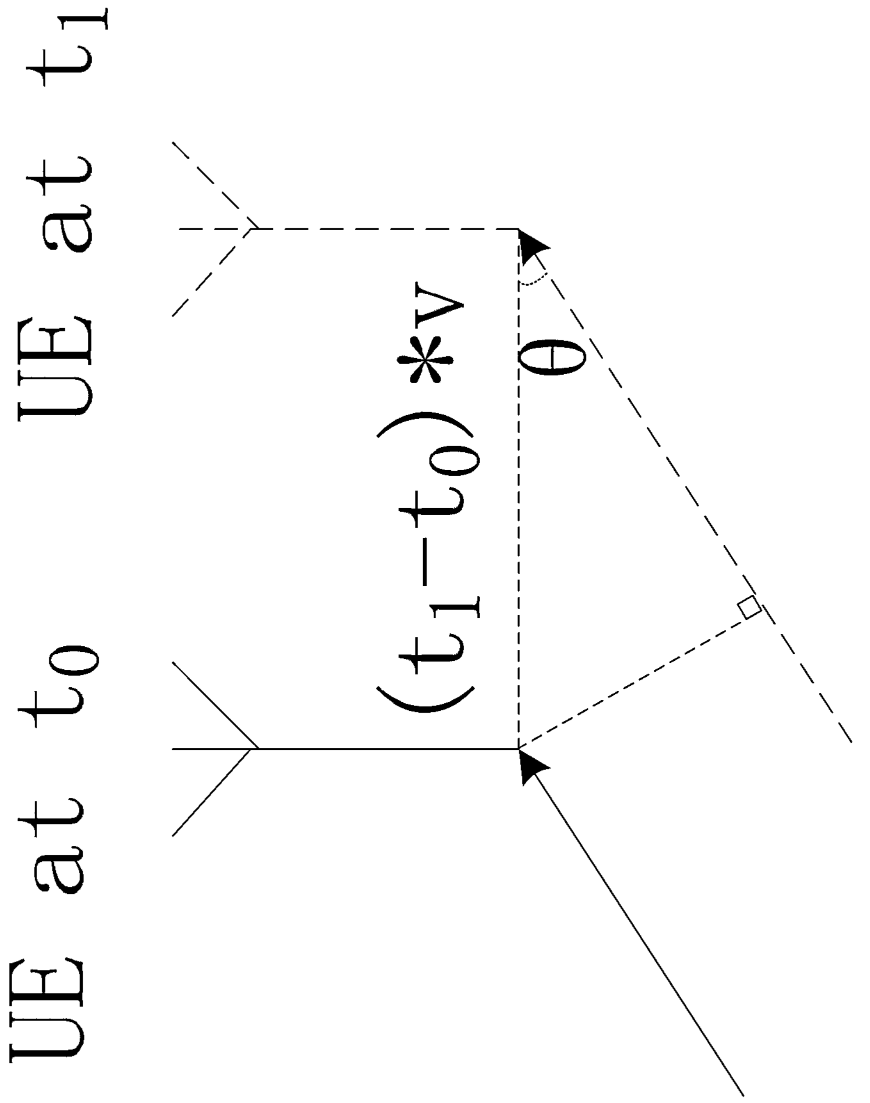
FIG. 6 shows a scenario where a user equipment (UE) moves between two times to and t1.

Using the scenario shown in FIG. 6 where a UE moves between time $t_0$ and time $t_1$, if $(t_1-t_0)*v \leq \lambda$, then the AoA is $$\theta = \arccos\left(\Delta\Phi^* \lambda / ((t_1 - t_0)^* v)\right) \quad \text{(Equ. 7)}$$

If $(t_1-t_0)*v > \lambda$, then the UE is required to measure against till the following equation holds. After that, the Equ. 7 is applied for this measurement.

$$(t_1 - t_0)^* v \leq \lambda \quad \text{(Equ. 8)}$$

where the arccos( ) is a function of arccosine, $\Delta\Phi$ is the normalized carrier phase difference measured between time t0 and t1, the $\Delta\Phi$ is with a range of 0.0~1.0 (e.g., with an unit of $2\pi$).

It should be noted that, no matter whether $(t_1-t_0)*v$ is greater than $\lambda$ or not, the Equ. 8 can also applied.

In some embodiments, a UE reports carrier phase difference measured between time $t_0$ and $t_1$ and moving speed. In some embodiments, a UE reports carrier phase difference measured between time $t_0$ and $t_1$ and moving speed, where $t_1-t_0$ is a predefine period (e.g., one frame, or the periodicity of the reference signal for positioning). In some embodiments, the $t_0$ and $t_1$ can be the time-stamp in the report.

After report of this AoA information, a location can be determined by a LMF (or UE if with the information of layout of base stations nearby).

In some embodiments, a UE reports carrier phase difference measured between time $t_0$ and $t_1$, moving speed. and moving direction. The moving direction can be used to adjust the AoA.

With this method, the distance between UE and base station can be precisely computed. Hence, the performance of positioning can be improved.

VI. Example 5: Multiple Paths for Smoothing Timing-Based Positioning

Figure 7:
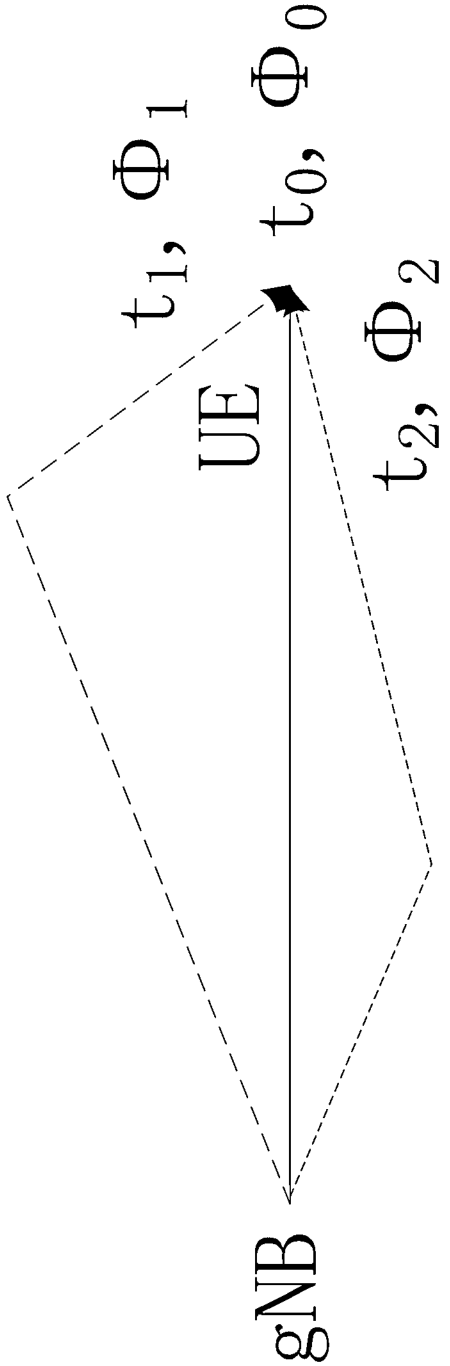
FIG. 7 shows that a UE may receive a signal with multiple paths.

FIG. 7 shows that a UE may receive a signal with multiple paths (e.g., a LOS path arriving at to with a carrier phase of $\Phi_0$, a reflection path arriving at $t_1$ with a phase of $\Phi_1$, another reflection path arriving at $t_2$ with a phase of $\Phi_2$).

The carrier phase of multiple paths can be used for validating a timing-based positioning technology. For example, if the $t_0$ were from time of arrival (TOA)-based technology, then its corresponding carrier phase should be $$\Phi_0 = \left(\frac{c \cdot t_0}{\lambda} \bmod 1.0\right) \cdot 2\pi \quad \text{(Equ. 9)}$$

If the carrier phase measured were far away from the $\Phi_0$ above, then we should consider it is invalid.

Similarly, the carrier phase of multiple paths can be used for checking whether a path exists or not (or a virtual path, e.g., a path synthesized by other paths).

The carrier phase of multiple paths can be used for smoothing (e.g., averaging or filtering the time related information, e.g., arrival time, differential of arrival time, distance) a timing-based positioning technology (e.g., TDOA, TOA, etc.). For example, the following equation is applied where K is an integer after searching algorithm.

$$t_{Final} = \min\left(t_0, \left(\left(K + \frac{\Phi_0}{2\pi}\right)\frac{\lambda}{c}\right)\right) \quad \text{(Equ. 10)}$$

It should be noted that, in Equ. 10 above, the min( ) operation can be replaced by mean( ) operation (e.g., average value).

Similarly, the carrier phase of multiple paths can be used for smoothing a time difference of arrival (TDOA)-based positioning technology (including reference signal time difference, RSTD) where the $\Delta\Phi$ (used to replace $\Phi_0$) and final time difference are computed as the following. It should be noted that, the $t_0$ and $t_1$ can come from different gNB.

$$\Delta\Phi = \Phi_1 - \Phi_0 \quad \text{(Equ. 11)}$$

$$\Delta t_{Final} = \min\left((t_1 - t_0), \left(\left(K + \frac{\Delta\Phi}{2\pi}\right)\frac{\lambda}{c}\right)\right) \quad \text{(Equ. 12)}$$

It should be noted that the differential carrier phase $\Delta\Phi$ can be measured as the carrier phase of the second signal when the first signal is in zero phase. Multiple measurements can be averaged. For example, for Comb=2, the differential carrier phase of these two signals is the carrier phase of the resource element (RE) with even index subtracts the carrier phase of the RE with odd index on one symbol. For another example, an operation of the following equation can also find the differential carrier phase of two signals.

$$\theta = \text{angle}\,(\text{Signal\_1} * conj(\text{Signal\_2})) \quad \text{(Equ. 13)}$$

where, the angle( ) is to find the angle (or phase) of operand, conj is conjunction of operand.

In some embodiments, a UE can first estimate an angle of departure (AoD) and beam direction of the beam with which positioning related reference signal is received. After that, a UE adjusts its carrier phase(s) (e.g., on multiple paths) according to AoD and beam direction as the following.

$$\Phi_{Final} = \Phi + k \cdot \text{abs}\,(\theta_{Beam} - \theta_{AoD}) \quad \text{(Equ. 13A)}$$

where, $\Phi$ is the carrier phase measured on a path, k is a factor (e.g., 0.1), abs( ) is for absolute value.

With this method, the carrier phase of multiple paths can be used for smoothing timing-based positioning. Hence, the performance of positioning can be improved.

VII. Example 6: Reference Point for (UL) CP Measurement

A reference point is helpful for cancelling out carrier phase error. In some embodiments, a gNB (or TRP) reports the original CP value(s) without differential directly to the network (e.g., LMF).

If one gNB (or TRP) were request to measure the CP of SRS from one serving cell (or gNB, or TRP), then the reference point of CP value can be the request side. A differential CP value between itself and the reference point should be reported.

If one gNB (or TRP) were request to measure the CP of SRS from the network (e.g., LMF), then the reference point of CP value can be indicated by the network (e.g., LMF). A differential CP value between itself and the reference point should be reported.

If one gNB (or TRP) were installed with multiple antennas, the reference point is one antenna (e.g., the first antenna). In some embodiments, if one gNB (or TRP) were with multiple antenna ports, the reference point is one antenna port (e.g., the first antenna port or, the antenna port with lowest port index).

If one gNB (or TRP) were configured with multiple resources for positioning reference signal, the reference point is one resource (e.g., the resource with lowest index, e.g., 0). If one gNB (or TRP) were configured with multiple resource sets for positioning reference signal, the reference point is one resource set (e.g., the resource set with lowest index, e.g., 0).

In some embodiments, the reference point used in timing differential-based positioning (e.g., RSTD, TDOA, round trip time, RTT, single side RTT, double side RTT) is set as the reference point for (UL) CP measurement.

In some embodiments, one PEG applies different reference point for (UL) CP measurement. In some embodiments, for (UL) CP measurement, antennas in one PEG apply different reference point from antennas in a TEG. In some embodiments, for (UL) CP measurement, antenna port(s) in one PEG apply different reference point from antennas in a TEG. In some embodiments, for (UL) CP measurement, resource(s) (fore reference signal) associated with an antenna port in one PEG apply different reference point from antennas in a TEG. In some embodiments, for (UL) CP measurement, one antenna in one PEG applies different reference point from one antenna of TEG. In some embodiments, for (UL) CP measurement, antennas in one PEG applies two different reference points.

In some embodiments, one PEG applies different reference TRP for (UL) CP measurement. In some embodiments, antennas in one PEG applies different reference TRP for (UL) CP measurement. In some embodiments, antenna port(s) in one PEG applies different reference TRP for (UL) CP measurement. In some embodiments, resource(s) (fore reference signal) associated with an antenna port in one PEG applies different reference TRP for (UL) CP measurement. In some embodiments, for (UL) CP measurement, antennas in one PEG apply different reference TRP from antennas in a TEG. In some embodiments, for (UL) CP measurement, one antenna in one PEG applies different reference TRP from an antenna in a TEG. In some embodiments, for (UL) CP measurement, antennas in one PEG apply two different reference TRP.

In some embodiments, a constant offset (or a fixed value) can be set as the reference point. For example, $\Phi_0=\pi/4$ is set as the reference point (e.g., for QPSK modulation), $\Phi-\Phi_0$ is reported differential CP value where the $\Phi$ is the original CP value.

With this method, the reported CP value can be more precise. Hence, the performance of positioning can be improved.

VIII. Example 7: Measure/Report the Slope of CP Increment of Sub-Carriers

According to Equ. 1, the following equation holds.

$$\Phi + N = \frac{d}{\lambda} = \frac{d}{\frac{c}{f}} = d/\left(c/(f_c + i*SCS)\right) \quad \text{(Equ. 14)}$$

where, the i is the index of sub-carrier, SCS is the sub-carrier spacing. If the CP value of two neighbouring SCS were not phase-crossing (e.g., the N is kept without change, the phase is not over $2\pi$), then the following equation holds where the $\Delta\Phi$ is the CP increment of two adjacent sub-carriers with identical integer N.

$$\Delta\Phi = (d/c)*SCS \quad \text{(Equ. 15)}$$

$$\Delta\Phi/SCS = d/c \quad \text{(Equ. 16)}$$

That is, if the slope of CP increment of two adjacent sub-carriers were reported, then the target receiver can calculate the distance. Hence, it is desired that

- the CP value of each sub-carriers is measured/reported.
- the slope of CP increment of two adjacent sub-carriers is measured/reported.
- the average CP value of group(s) of sub-carriers is/are measured/reported. For example, one group of sub-carriers includes N_RB*12 sub-carriers where the N_RB is the number of RB, e.g., N_RB=6.
- the differential CP value between two adjacent sub-carriers (e.g., the CP value with high SC index subtracts the CP value with low SC index, $\Phi_2-\Phi_1$) is measured/reported. In some embodiments, the average differential CP value of two adjacent sub-carriers is measured/reported. In addition, the differential CP value of two adjacent sub-carriers can be grouped into several groups (e.g., 5 groups). In some embodiments, one group of differential CP value of two adjacent sub-carriers is reported once.

In some embodiments, the channel impulse response (CIR) of reference signal for positioning is measured/reported. For example, a complex value (e.g., a+j·b) of CIR on each RE of reference signal is measured/reported. In some embodiments, the CIR value is measured/reported with symbol index of the positioning related reference signal (e.g., CIR on different symbol are separately placed).

In some embodiments, the channel frequency response (CFR) of reference signal for positioning is measured/reported.

In some embodiments, for the purpose of positioning, a UE should report assistance data to the network as the following.

The accuracy of positioning expected by UE

The movement state of UE

The battery state of UE

The environment of UE (e.g., LOS/NLOS)

The antenna spacing of UE

With this method, the distance between UE and base station can be precisely determined via CP value. Hence, the performance of positioning can be improved.

IX. Example 8: Carrier Phases from Sub-Carriers with Segment

In Example 1 above, carrier phase measurement/report for multiple segments of a carrier is described. In this example, the (differential) carrier phases of resource block (RB) (or sub-carriers) in a segment/between segments are described in FIG. 8.

Figure 8:
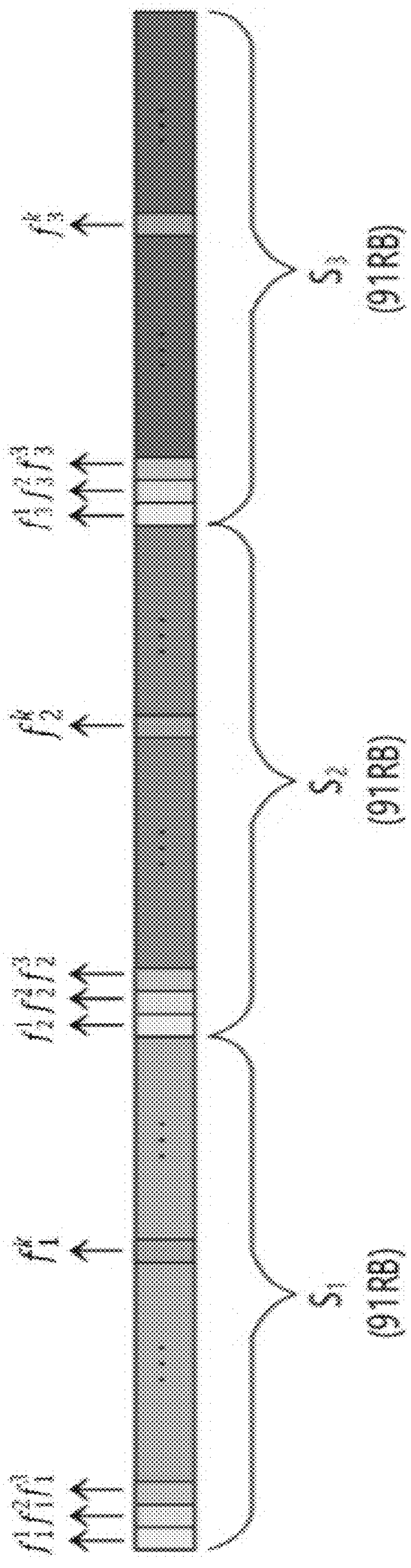
FIG. 8 shows carrier phases of resource block (RB) or sub-carriers in a segment or between segments.

As shown in FIG. 8, (also take the previous description as an example), there are three segments, each of which consists 91 RBs. The previous method (e.g., in Example 1 above) only calculated the differential carrier phases of these segmentation. In this example, carrier phase of different RB are evaluated. Specifically, denote the carrier phase on RB $$f_i^j \text{ as } \Phi_i^j,$$

where i,j represent the serial number of different segment and RB (within each segment), then the differential carrier phases on RB are $$\Phi_2^j - \Phi_1^j, \Phi_3^j - \Phi_2^j (j = 1, 2, \ldots , N^{RB},$$

in this example, $N^{RB}=91$.)

In Example 1 above, there are $N^{seg}-1$ sets of differential data. But in this example, there are $N^{RB}*(N^{seg}-1)$ sets of differential data. Hence, a higher positioning accuracy can be expected. In addition, differential carrier phases on sub-carriers between segments can also be achieved (e.g., by replacing $N^{RB}=91$) with $N^{SC}=12*N^{RB}=12*91=1092$.

With this method, the carrier phase can be more precise. Hence, the performance of positioning can be improved.

X. Example 9: AoD with Multiple Resources

Figure 9:
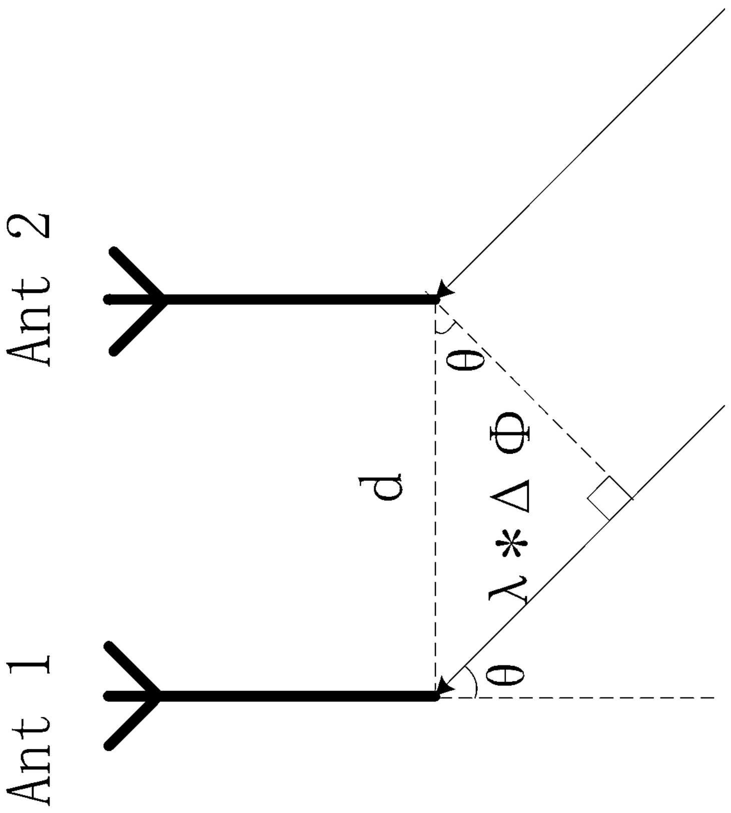
FIG. 9 shows an example of a transmitter equipped with multiple antennas.

As shown in FIG. 9, a transmitter (e.g., base station, gNB) is equipped with multiple antennas (e.g., two antennas). A receiver (e.g., user equipment, UE) receives signals from the transmitter. For this case, the angle of departure (AoD, e.g., θ) is $$\theta = \arcsin\left(\Delta\Phi * \lambda/d)\right) \quad \text{(Equ. 17)}$$

where the arcsin( ) is a function of arcsine, ΔΦ is the normalized carrier phase difference measured between antenna 2 and antenna 1, the ΔΦ is with a range of 0.0~1.0 (e.g., with an unit of 2π), d is the antenna spacing (e.g., d=λ/2).

For a transmitter (e.g., gNB, or Transmission-Receiving-Point, TRP), it can be configured (by Location Management Function, LMF) with multiple resources for reference signal for positioning. In some embodiments, a transmitter (e.g., gNB, or TRP) can be configured (by LMF) with multiple resource sets for reference signal for positioning.

In some embodiments, a transmitter (e.g., gNB, or TRP) can be configured (by LMF) with multiple sub-set of a resource (or resource set) for reference signal for positioning.

In some embodiments, each antenna of a transmitter transmits reference signal for positioning with different resource (or resource set).

In some embodiments, each antenna of a transmitter transmits reference signal for positioning with different sub-set of a resource (or resource set), e.g., sub-set 1 for antenna 1, sub-set 2 for antenna 2.

A UE (or gNB, or TRP) measures/reports measurement(s) of sub-set(s) of the resource for reference signal for positioning. When a UE (or gNB, or TRP) measures/reports positioning related measurement of a resource for reference signal for positioning, it can/should measure/report the measurement(s) of sub-set(s) of the resource for reference signal for positioning. When a UE (or gNB, or TRP) reports carrier phase measurement of a resource for reference signal for positioning, it can/should measure/report the carrier phase measurement(s) of sub-set(s) of the resource for reference signal for positioning. For example, when a UE measures/reports carrier phase measurement of a resource for PRS, a CP value from a first sub-set of PRS resource (e.g., on the antenna #1) and another CP value from a second sub-set of PRS resource (e.g., on the antenna #2) are measured/reported. For another example, a CP value from a first sub-set of PRS resource (e.g., on the antenna #1) and another CP value from a second sub-set of PRS resource (e.g., on the antenna #2) are measured/reported when the measurement result(s) of PRS resource is/are measured/reported. With these measurements results, a ΔΦ can be calculated. Hence, the AoD θ can be computed (with d and λ). Hence, the location of UE can be determined (e.g., with other measurement, e.g., received signal power).

In some embodiments, CP value(s) from a group of resource(s) should be measured/reported.

With this method, the AoD can be precisely computed which is better than classical AoD. Hence, the performance of positioning can be improved.

XI. Example 10: UE Processing Capability

The processing capability of a UE is limited. Hence, it can only perform limited measurement on carrier phase.

For a carrier (or BWP) in 5G-NR, a carrier phase measurement result can be measured on each sub-carrier that carries reference signal for positioning. If all the sub-carriers were required to be measured, then there will be a huge challenge to the processing capability of a UE. Based on this, at most P carrier phase measurement result(s) (e.g., P=8) are required to be measured. For the P carrier phase measurement result(s), it/they can come from measurement on sub-carrier, a group of sub-carriers, a RB, a group of RB, a group of RB group (RBG), a segment of carrier, a carrier (or PFL). In some embodiments, within a measurement period, at most P carrier phase measurement result(s) (e.g., P=8) are required to be measured. In some embodiments, within a measurement period, the value of P depends on UE capability (e.g., different UE can have different P value).

The requirement of P carrier phase measurement result(s) docs/do not apply for a reference signal resource if one or more reference signals overlapped with other high priority signal (in time domain, e.g., in some symbol).

In some embodiments, for each carrier, in every processing periodicity (e.g., T=100 ms, e.g., 10 radio frame), a UE can measure only Q carrier phase measurement result(s) (e.g., Q=4). In some embodiments, after measuring Q carrier phase measurement result(s), a UE can drop measurement on reference signal for positioning. In some embodiments, after measuring Q carrier phase measurement result(s), a UE can drop measurement (e.g., measurement of TDOA, RSTD, RTT) on reference signal for positioning.

In some embodiments, for each carrier, in every processing periodicity (e.g., T=200 ms, e.g., 20 radio frame), a UE can measure only W symbol(s) for carrier phase measurement (e.g., W=2). In some embodiments, the value of W depends on UE capability (e.g., different UE can have different W value). In some embodiments, W symbol(s) is/are equivalent to some milli-seconds (e.g., for SCS=15 kHz, one symbol is 1/14=0.0714 ms for normal cyclic prefix). In some embodiments, the value of P, Q, W are defined in per UE (or per band, or per band combination, or per frequency range).

In some embodiments, the processing period is associated with number carrier. In some embodiments, the carrier phase measurement related processing period is associated with number of carriers. In some embodiments, the carrier phase measurement related processing period is associated with number of sub-carriers. In some embodiments, the carrier phase measurement related processing period is associated with number of sub-carrier which each sub-carrier measures/reports a CP value.

In some embodiments, the carrier phase measurement related processing period is associated with number of RB which each RB measures/reports a CP value.

In some embodiments, the carrier phase measurement related processing period is associated with number of RBG which each RBG measures/reports a CP value.

In some embodiments, the carrier phase measurement related processing period ($T_{Final}$) is associated with number of segment (S) which each segment measures/reports a CP value (e.g., $T_{Final}$=S*$T_{OneSegment}$). A segment is a part of carrier.

In some embodiments, the effective processing period ($T_{eff}$) is associated with number of carriers (C) (e.g., $T_{eff}$=C*$T_{OneCarrier}$).

In some embodiments, the carrier phase measurement related effective processing period is associated with number of segment which each segment measures/reports a CP value (e.g., $T_{eff}$=SF*S*$T_{OneSegment}$, where SF is scaling factor).

In some embodiments, for a RedCap UE, the frequency hopping of reference signal may be applied. The number of hop may affect the complexity of UE. Then, the effective processing period ($T_{eff}$) is associated with number of hop (H) (e.g., $T_{eff}$=H*$T_{OneHop}$). By the way, the total measurement duration may be H times of that of a single measurement (of one hop, i.e., one measurement without frequency hopping).

In some embodiments, if the carrier phase measurement were configured for timing based measurement for positioning (e.g., TDOA, RSTD, RTT), then the carrier phase measurement and timing based measurement are performed over the same measurement period. In some embodiments, if the carrier phase measurement were configured for timing based measurement for positioning (e.g., TDOA, RSTD, RTT), then the carrier phase measurement and timing based measurement are performed over the same reference signal resource (set). This will reduce resource overhead and measurement time.

In some embodiments, if timing based measurement for positioning (e.g., TDOA, RSTD, RTT, multi-RTT) were configure, then the carrier phase measurement should also be performed. In some embodiments, if timing based measurement for positioning (e.g., TDOA, RSTD, RTT, multi-RTT) were configure, then the carrier phase measurement should also be performed if UE (or gNB, or TRP) has this capability.

In some embodiments, if timing based measurement for positioning (e.g., TDOA, RSTD, RTT, multi-RTT) were configure, then the carrier phase measurement should also be performed on the same measurement period. In some embodiments, if timing based measurement for positioning (e.g., TDOA, RSTD, RTT, multi-RTT) were configure, then the carrier phase measurement should also be performed on the same measurement resource for reference signal for positioning.

In some embodiments, if the carrier phase measurement were configured for angle based measurement for positioning (e.g., AOA, AOD, phase difference based angle, reference signal received power, RSRP, path RSRP, RSRPP), then the carrier phase measurement and angle based measurement are performed over the same measurement period. In some embodiments, if the carrier phase measurement were configured for angle based measurement for positioning, then the carrier phase measurement and angle based measurement are performed over the same reference signal resource (set).

With this method, the carrier phase measurement can be precisely performed. Hence, the performance of positioning can be improved.

Figure 10:
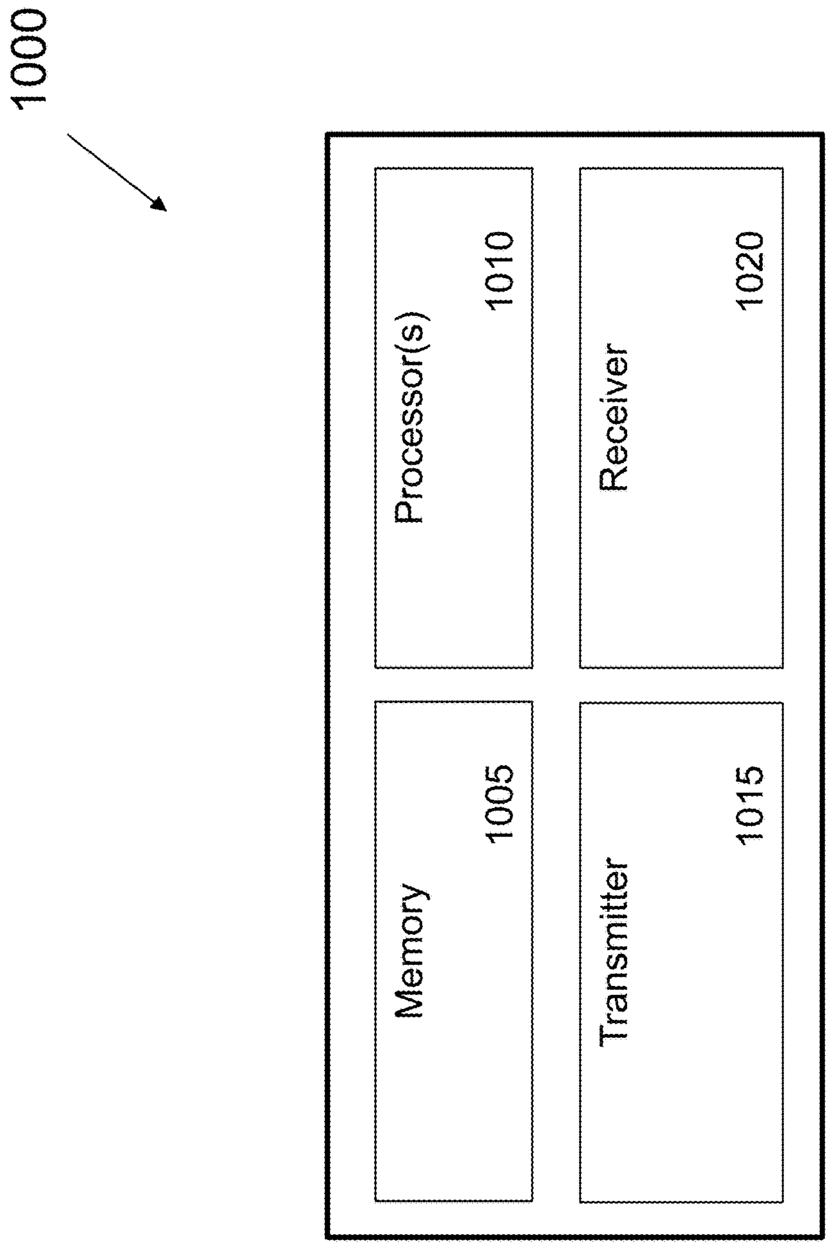
FIG. 10 shows an exemplary block diagram of a hardware platform that may be a part of a network device or a communication device.

FIG. 10 shows an exemplary block diagram of a hardware platform 1000 that may be a part of a network device (e.g., base station) or a communication device (e.g., a user equipment (UE)). The hardware platform 1000 includes at least one processor 1010 and a memory 1005 having instructions stored thereupon. The instructions upon execution by the processor 1010 configure the hardware platform 1000 to perform the operations described in FIGS. 1 to 9 and 11 to 13 and in the various embodiments described in this patent document. The transmitter 1015 transmits or sends information or data to another device. For example, a network device transmitter can send a message to a user equipment. The receiver 1020 receives information or data transmitted or sent by another device. For example, a user equipment can receive a message from a network device.

Figure 11:
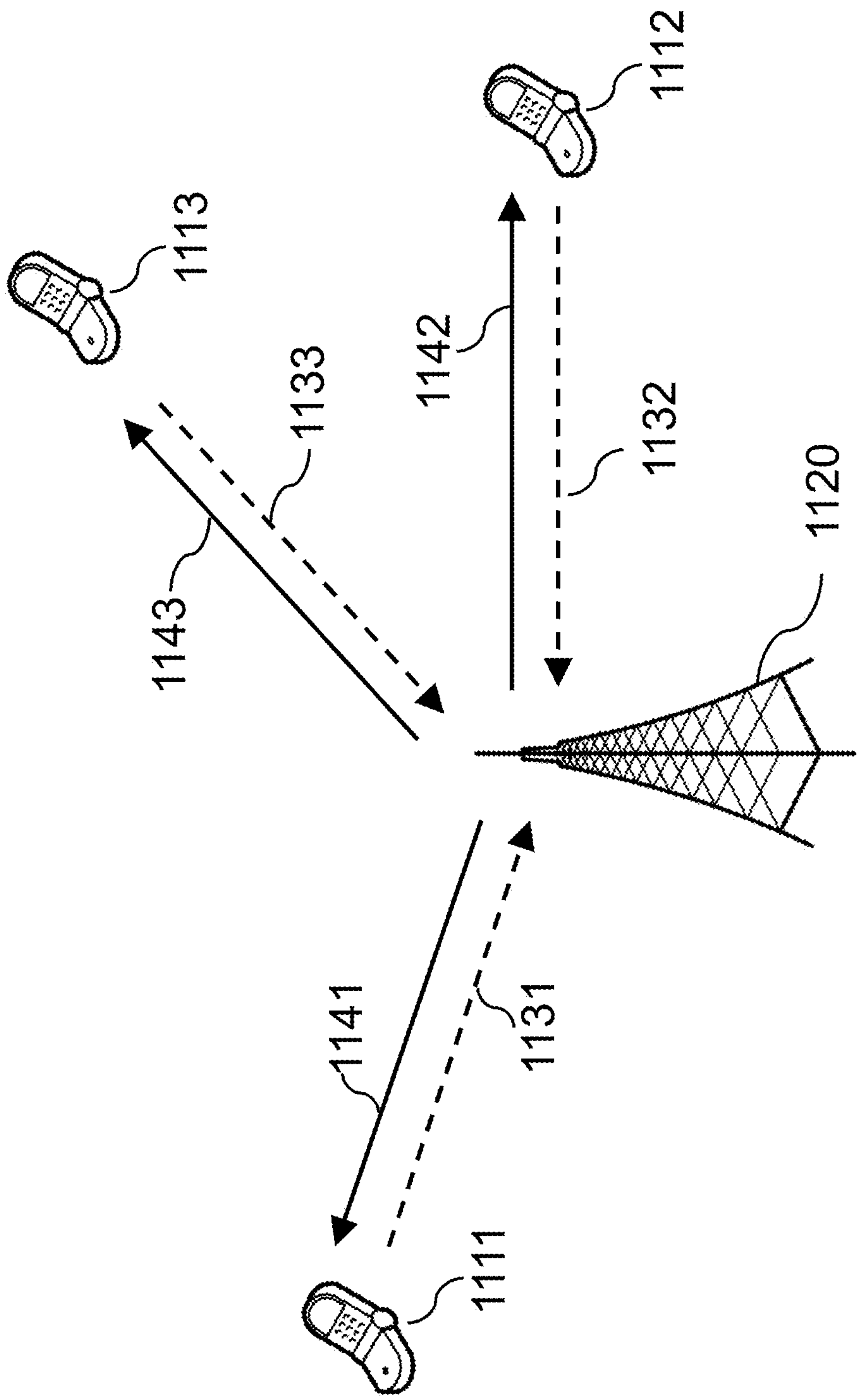
FIG. 11 shows an example of wireless communication including a base station (BS) and user equipment (UE) based on some implementations of the disclosed technology

The implementations as discussed above will apply to a wireless communication. FIG. 11 shows an example of a wireless communication system (e.g., a 5G or NR cellular network) that includes a base station 1120 and one or more user equipment (UE) 1111, 1112 and 1113. In some embodiments, the UEs access the BS (e.g., the network) using a communication link to the network (sometimes called uplink direction, as depicted by dashed arrows 1131, 1132, 1133), which then enables subsequent communication (e.g., shown in the direction from the network to the UEs, sometimes called downlink direction, shown by arrows 1141, 1142, 1143) from the BS to the UEs. In some embodiments, the BS send information to the UEs (sometimes called downlink direction, as depicted by arrows 1141, 1142, 1143), which then enables subsequent communication (e.g., shown in the direction from the UEs to the BS, sometimes called uplink direction, shown by dashed arrows 1131, 1132, 1133) from the UEs to the BS. The UE may be, for example, a smartphone, a tablet, a mobile computer, a machine to machine (M2M) device, an Internet of Things (IoT) device, and so on.

Figure 12:
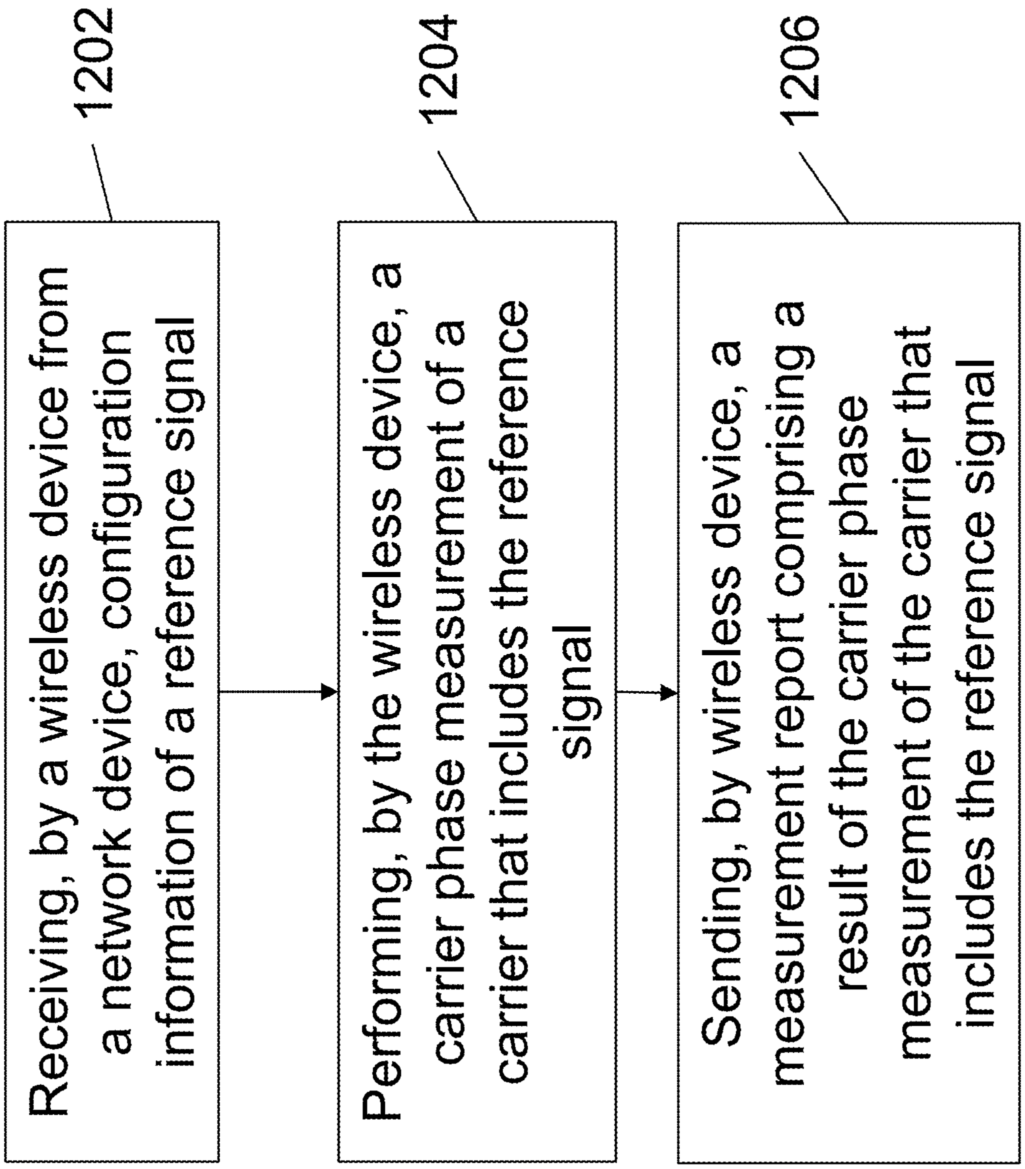
FIG. 12 shows an exemplary flowchart for providing carrier phase measurements.

FIG. 12 shows an exemplary flowchart for providing carrier phase measurements. Operation 1202 includes receiving, by a wireless device from a network device, configuration information of a reference signal. Operation 1204 includes performing, by the wireless device, a carrier phase measurement of a carrier that includes the reference signal. Operation 1206 includes sending, by wireless device, a measurement report comprising a result of the carrier phase measurement of the carrier that includes the reference signal.

In some embodiments, the configuration information includes a total number of a plurality of segments of the carrier that includes the reference signal, and the carrier phase measurement is performed on each of the plurality of segments. In some embodiments, the configuration information includes a value with which a range of an integer N is determined for each of the total number of the plurality of segments, the carrier phase measurement is performed on each of the plurality of segments, and N is an integer part of a measured carrier phase for each of the plurality of segments. In some embodiments, the configuration information includes only one value with which a range of an integer N is determined for only one frequency layer of multiple frequency layers associated with carrier phase positioning (CPP), and N is an integer part of a measured carrier phase. In some embodiments, the configuration information includes a frequency value that indicates a separation between two adjacent segments in frequency domain.

In some embodiments, the configuration information includes a wavelength value that is a function of a speed of light and a frequency value that indicates a separation between two adjacent segments in frequency domain. In some embodiments, the configuration information includes an application scenario for the carrier phase measurement, wherein the application scenario describes an area where a user equipment (UE) and a base station are located. In some embodiments, the configuration information includes a bandwidth for the carrier phase measurement. In some embodiments, the measurement report includes a differential carrier phase value between any two of the total number of segments. In some embodiments, the carrier phase measurement is performed using a first set of one or more antennas within a Phase Error Group (PEG) that is different from a second set of one or more antennas within a timing error group (TEG). In some embodiments, the carrier phase measurement is performed using one Phase Error Group (PEG) that has an identical set of one or more antennas with one timing error group (TEG). In some embodiments, the carrier phase measurement is performed using a Phase Error Group (PEG) that is a sub-set of timing error group (TEG), the PEG includes a first set of one or more antennas, and the TEG includes a second set of one or more antennas.

In some embodiments, the carrier phase measurement is performed using antennas of one Phase Error Group (PEG) that is associated with one reference signal resource. In some embodiments, the carrier phase measurement is performed by the wireless device using antennas in a same receiving Phase Error Group (PEG). In some embodiments, the measurement report includes an angle of arrival that is calculated using the following equation: $\theta=\arccos(\Delta\Phi*\lambda((t1-t_0)*v))$, and where arccos( ) is a function of arccosine, $\Delta\Phi$ is a normalized carrier phase difference measured between time t0 and t1, $\lambda$ is a wavelength of the carrier that includes reference signal, and v is a velocity of the wireless device.

In some embodiments, the measurement report includes a carrier phase difference measured between time t0 and t1 and a moving speed, where (t1−t0) is a pre-defined time period.

In some embodiments, the carrier phase measurement is performed by the wireless device by adjusting one or more carrier phases according to an angle of departure and beam direction of a beam with which the reference signal is received. In some embodiments, the carrier phase measurement is performed by setting a same reference point for performing timing differential-based positioning and for the performing the carrier phase measurement. In some embodiments, the carrier phase measurement is performed by one Phase Error Group (PEG) applying different reference point from that of a timing error group (TEG). In some embodiments, the carrier phase measurement is performed by one Phase Error Group (PEG) applying different reference transmit-receive point (TRP) from that of a timing error group (TEG). In some embodiments, the carrier phase measurement includes determining a differential carrier phase (CP) value between two adjacent sub-carriers of the carrier.

In some embodiments, the measurement report includes channel impulse response value of the reference signal with a symbol index of the reference signal. In some embodiments, the measurement report includes a channel frequency response value of the reference signal with a sub-carrier index and a symbol index of the reference signal. In some embodiments, the measurement report includes one or more carrier phase measurements of one or more subsets of a resource for the reference signal corresponding to the measurement report of a carrier phase measurement of the resource for the reference signal. In some embodiments, the carrier phase measurement is performed along with a timing based measurement over a same measurement period. In some embodiments, the same measurement period is in response to the carrier phase measurement and the timing based measurement being configured to determine positioning of the wireless device. In some embodiments, the wireless device includes a communication device. In some embodiments, the wireless device includes a base station.

Figure 13:
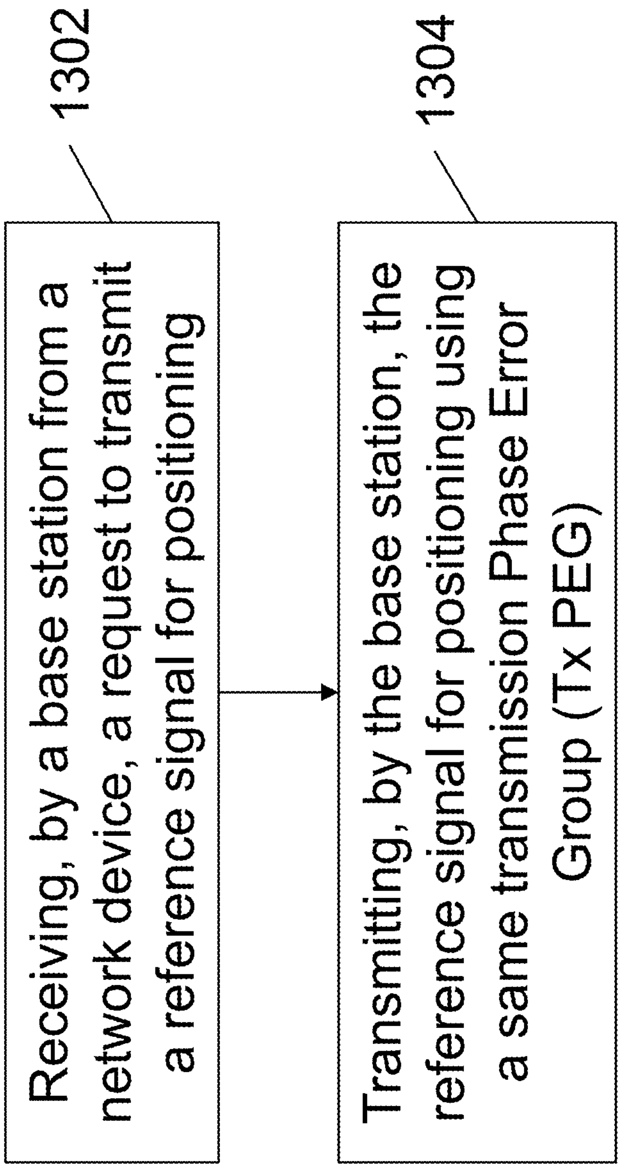
FIG. 13 shows an exemplary flowchart for transmitting a reference signal for positioning.

FIG. 13 shows an exemplary flowchart for transmitting a reference signal for positioning. Operation 1302 includes receiving, by a base station from a network device, a request to transmit a reference signal for positioning. Operation 1304 includes transmitting, by the base station, the reference signal for positioning using a same transmission Phase Error Group (Tx PEG). In some embodiments, the Tx PEG is identical to transmission timing error group (Tx TEG).

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. In some embodiments, or additionally, the disclosed components or modules can be implemented as an Application Specific Integrated Circuit (ASIC) and/or as a Field Programmable Gate Array (FPGA) device. Some implementations may additionally or In some embodiments include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:

receiving, by a wireless device from a network device, configuration information of a reference signal;

performing, by the wireless device, a carrier phase measurement of a carrier that includes the reference signal; and sending, by wireless device, a measurement report comprising a result of the carrier phase measurement of the carrier and a time difference of arrival (TDOA) measurement of the carrier, wherein the carrier includes the reference signal, wherein a reference point used in a timing differential-based positioning technique is same as that used in the carrier phase measurement, wherein the reference point is a reference transmission reception point (TRP).

2. The method of claim 1, wherein the carrier phase measurement is performed along with a timing based measurement over a same measurement period.

3. The method of claim 1, wherein the timing differential-based positioning technique is a reference signal time difference (RSTD).

4. An apparatus for wireless communication comprising at least one processor, configured to implement a method that causes the apparatus to:

receive, by a wireless device from a network device, configuration information of a reference signal;

perform, by the wireless device, a carrier phase measurement of a carrier that includes the reference signal; and send, by wireless device, a measurement report comprising a result of the carrier phase measurement of the carrier and a time difference of arrival (TDOA) measurement of the carrier, wherein the carrier includes the reference signal, wherein a reference point used in a timing differential-based positioning technique is same as that used in the carrier phase measurement, wherein the reference point is a reference transmission reception point (TRP).

5. The apparatus of claim 4, wherein the carrier phase measurement is performed along with a timing based measurement over a same measurement period.

6. The apparatus of claim 4, wherein the timing differential-based positioning technique is a reference signal time difference (RSTD).

7. A non-transitory computer readable program storage medium having code stored thereon, the code, when executed by at least one processor of an apparatus, causes the apparatus to implement a method, comprising:

receiving, by a wireless device from a network device, configuration information of a reference signal;

performing, by the wireless device, a carrier phase measurement of a carrier that includes the reference signal; and sending, by wireless device, a measurement report comprising a result of the carrier phase measurement of the carrier and a time difference of arrival (TDOA) measurement of the carrier, wherein the carrier includes the reference signal, wherein a reference point used in a timing differential-based positioning technique is same as that used in the carrier phase measurement, wherein the reference point is a reference transmission reception point (TRP).

8. The non-transitory computer readable program storage medium of claim 7, wherein the carrier phase measurement is performed along with a timing based measurement over a same measurement period.

9. The non-transitory computer readable program storage medium of claim 7, wherein the timing differential-based positioning technique is a reference signal time difference (RSTD).

* * * * *